United States Patent

[11] 3,557,877

| [72] | Inventor | Marvin G. Hoffman |
| | | RFD Route, Carrington, N. Dak. 58421 |
| [21] | Appl. No. | 727,294 |
| [22] | Filed | May 7, 1968 |
| [45] | Patented | Jan. 26, 1971 |

[54] POWERED ROCK PICKER
13 Claims, 9 Drawing Figs.

[52] U.S. Cl. .................................................. 171/63, 56/27
[51] Int. Cl. ...................................................... A01b 43/00
[50] Field of Search ........................................... 171/63, 1.5, 1.7; 37/2; 56/27; 214/(Inquired)

[56] References Cited
UNITED STATES PATENTS

| 2,136,417 | 11/1938 | Downey | 56/27 |
| 2,817,449 | 12/1957 | Meyer et al. | 56/27 |
| 2,827,969 | 3/1958 | McPherson | 171/63 |

*Primary Examiner*—Antonio F. Guida
*Attorneys*—Clarence A. O'Brien and Harvey B. Jacobson ABSTRACT: A tractor mounted rock-picking device comprising a plurality of plate braced forwardly projecting picking teeth rigidly affixed to a vertical backstop which is in turn pivotally mounted on a pair of powered lift arms for both vertical and angular adjustment.

Marvin G. Hoffman
INVENTOR.

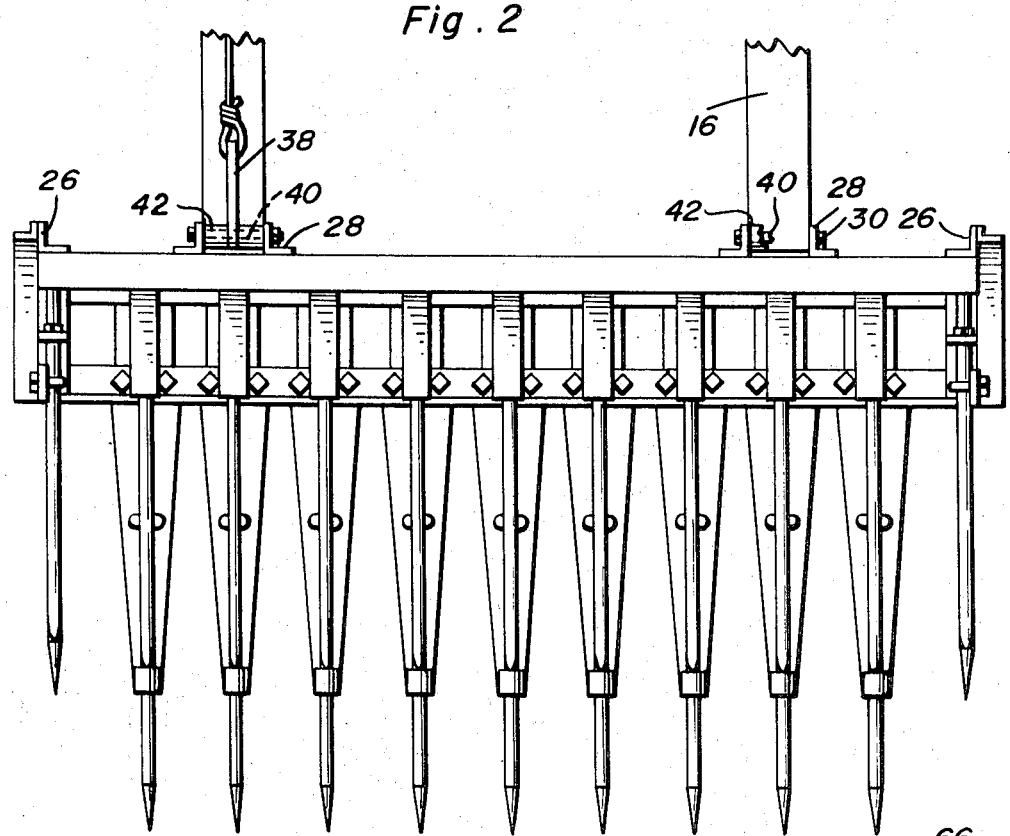
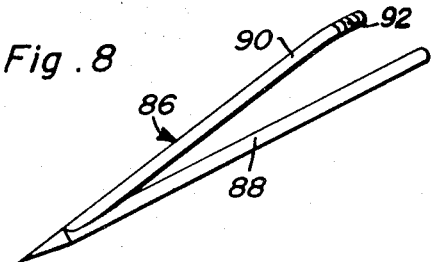
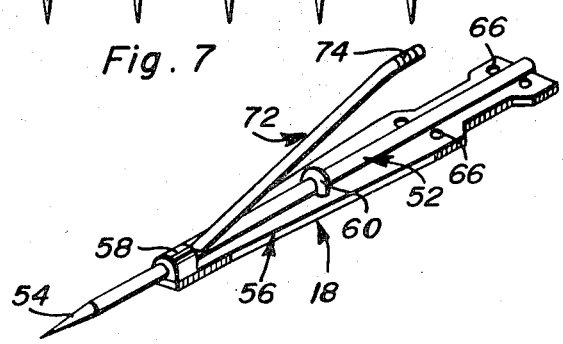
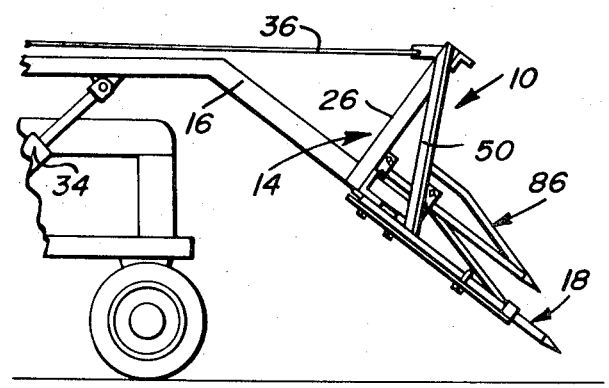

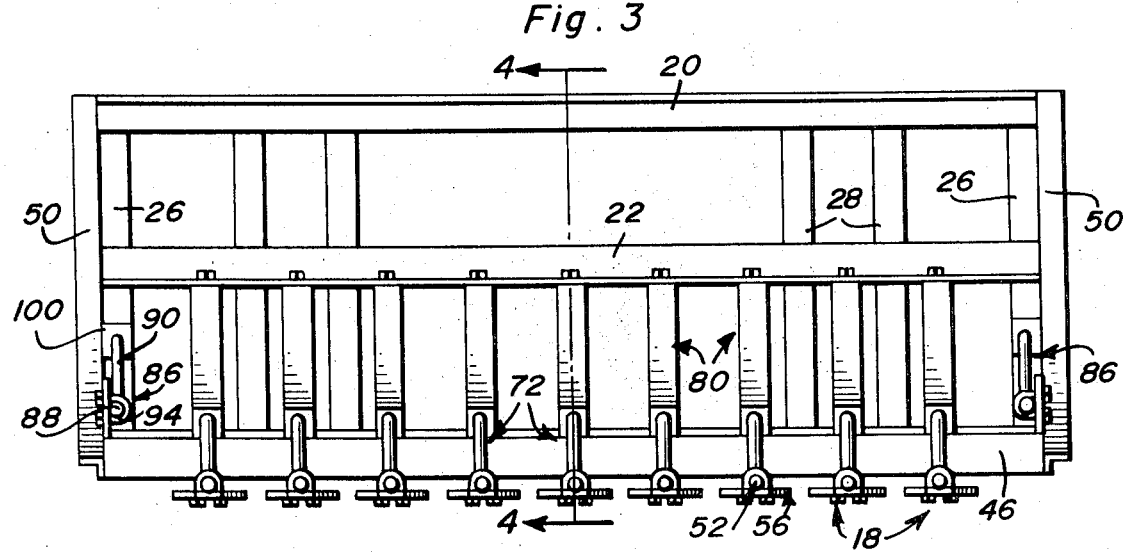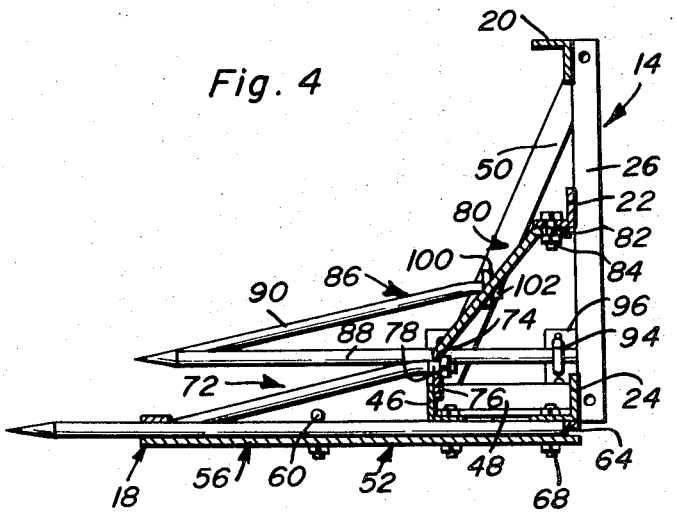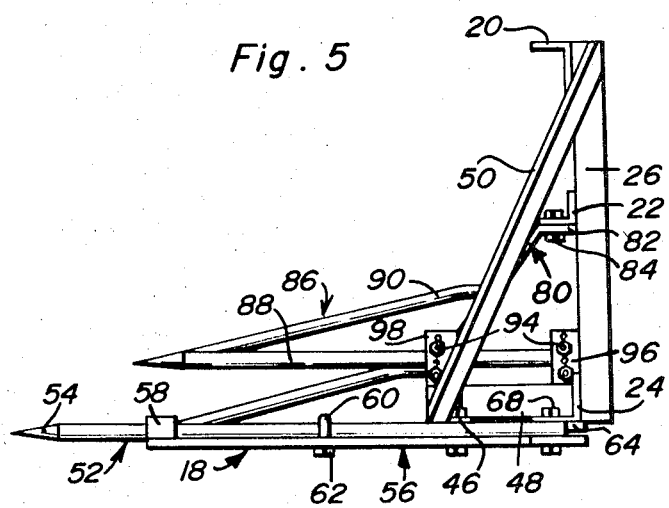

POWERED ROCK PICKER

The instant invention generally relates to equipment for clearing fields, and is more particularly concerned with a rock picker which is mounted on a tractor or the like for a powered control thereof.

It is a primary object of the instant invention to provide a powered rock picker wherein a vertically and angularly adjustable picking head is provided in conjunction with a plurality of rock digging and dislodging teeth suitably rigidified and supported so as to actually support and carry the dug rocks.

Another significant object of the instant invention resides in the provision of a picker head which is of a highly stable, rigid and relatively simple construction capable of effectively operating in the dislodging and raising of rocks without sustaining damage thereto.

In conjunction with the above object, it is also a significant object of the instant invention to provide a picker head wherein provision is made for loose dirt and the like falling from the picker head back to the ground whereby only the rock will be removed.

Basically, the objects of the invention are achieved through the provision of a rock picking attachment for a tractorlike vehicle, which attachment includes a rigid and vertical backstop having a plurality of rodlike braced and supported teeth or fingers projecting forwardly therefrom. A pair of side retaining members, also in the form of rodlike picking teeth, are provided for cooperation with the primary picking teeth in the digging and raising of rock. The picker head itself is mounted for vertical movement on a pair of tractor lift arms and for pivotal movement also controlled from the tractor itself.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 2 is an enlarged top plan view of the picker head;

FIG. 3 is a front elevational view of the picker;

FIG. 4 is a cross-sectional view taken substantially on a plane passing along line 4—4 in FIG. 3;

FIG. 5 is an end elevational view of the picker or picker head;

FIG. 7 is a perspective view of one of the braced and supported picking teeth or fingers;

FIG. 8 is a perspective view of one of the side members; and

FIG. 9 is a side elevational view of the mounted picker in an elevated and dumping position.

Figure 1:
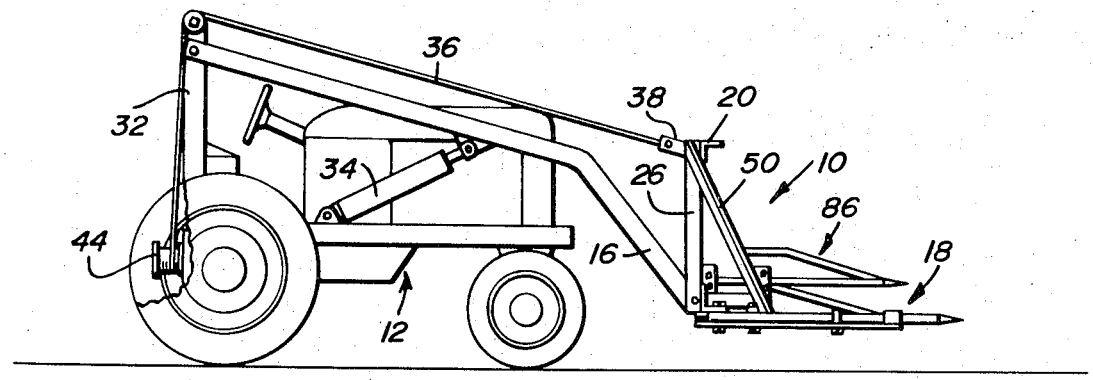
FIG. 1 is a side elevational view of a tractor with the rock picker of the instant invention mounted thereon.

Referring now more specifically to the drawings, reference numeral 10 is used to generally designate the picking head with reference numeral 12 designating the tractor or similar vehicle which mounts and controls the operation of the picker head 10.

The picker head 10 includes a rigid backstop and mounting frame 14 which is pivotally mounted on the forward ends of a pair of tractor mounted lift arms 16 and which in turn rigidly mounts the rock-picking finger or tooth units 18. This backstop, rectangular in configuration, includes three full width angle bars, an upper bar 20, an intermediate bar 22 and a lower bar 24. These transversely extending angle bars are in turn rigidly interconnected into a supporting frame by two end vertical angle bars or members 26 welded or otherwise rigidly affixed thereto, as well as two intermediate pairs of angle members or bars 28, also welded or otherwise affixed to the transverse angle members 20, 22 and 24. The two pairs of vertical angle bars 28 mount, at the lower ends thereof, the forward ends of the two lift arms 16, this being a pivotal mounting effected by transversely extending pivot pins or rods 30 having the opposite ends thereof supported within the opposed rearwardly projecting flanges of these vertical angle bars 28.

The lift arms 16 are to be mounted on the tractor in any conventional manner so as to enable a vertical movement of the picker head 10, for example by being pivotally secured to vertical posts 32 extending upwardly from the rear of the tractor, and by being controlled by appropriate double-acting hydraulic piston and cylinder units 34 supplied from the tractor hydraulic system. In addition to being vertically adjustable in conjunction with the lift arms 16, the picker head, as will be appreciated from a comparison of FIGS. 1 and 9, is to pivotally move relative to the lift arms 16. This is effected by means of a pair of elongated control cables 36 pivotally mounted, through a pair of links 38, to the rear upper portion of the picker head frame 14, preferably by means of appropriate pivot pins 40 extending through the two pairs of vertical angle members 28 as will be best appreciated from FIG. 2. If so desired, each of the links 38 can be centered between the corresponding pair of mounting angle members 28 by appropriate spacer sleeves 42 mounted on the corresponding pin 40 to each side of the link 38. The actual extension and retraction of the cables 36 required so as to effect pivotal control of the picker head 10 can be effected in any desired manner, such as for example through an appropriate winch 44 mounted on the tractor power takeoff, the two cables 36 of course being wound about the winch so as to provide for a coordinated takeup or release of the cables 36. It will of course be appreciated that the overbalanced nature of the picker head will result in the downward pivoting of the picker head as suggested in FIG. 9 upon an unwinding of the cables 36.

Another full width angle bar or member 46 is provided parallel to and forwardly spaced in relation to the lower angle bar 24, the bars 24 and 46 being so oriented as to have the horizontal flanges inwardly directed toward each other and coplanar. The bars 24 and 46 are rigidly interconnected by a pair of end angle members or bars 48 which overly and are welded to the inwardly directed bar flanges. A further stablilization of the forward angle member 46 is effected by a pair of rigid diagonal angle member braces 50 extending between and rigidly welded to the opposed ends of the angle bar 46 and the upper end portions of the vertical bars 26.

Figure 6:
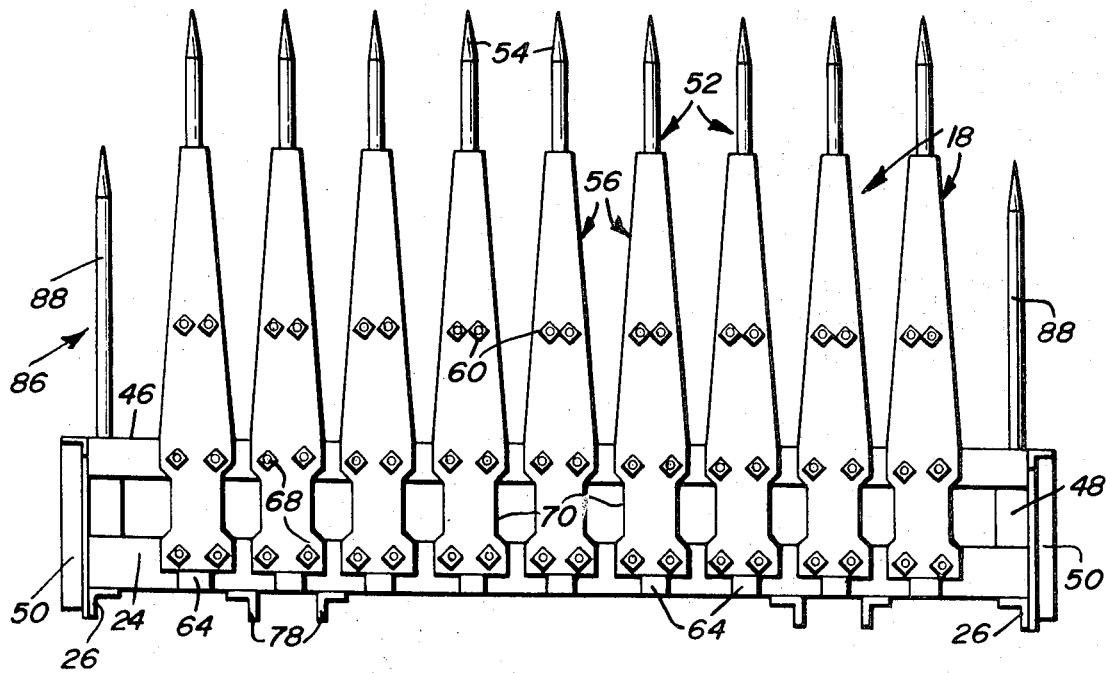
FIG. 6 is an enlarged bottom plan view of the picker head.

Referring now to the picking finger unit 18 itself, such includes an elongated rodlike picking finger or tooth 52 having a pointed ground piercing tip or forward end portion 54 thereon. A relatively narrow elongated fingerlike support plate 56 underlies a major portion of the length of the finger 52 commencing at the rear end thereof and terminating short or rearward of the pointed forward portion 54. The forward end of the support plate 56 has an upstanding collar 58 rigidly affixed thereto, this collar receiving the rodlike picking finger 52 therein with the finger 52 being additionally secured to the supporting plate 56 by an appropriate U-bolt 60 encircling the finger 52 and projecting through a pair of opposed holes in the plate 56 for the reception of securing nuts 62 on the threaded ends thereof, these nuts 62 of course bearing on the undersurface of the support plate 56. The rear portion of each of the picking finger units 18 underlies the horizontal flanges of the transverse bars 24 and 46 with the picking finger 52 itself engaged thereagainst and positioned by an appropriate stop 64 welded to and depending from the rear edge of the rear lower bar 24. The support plate 56 associated with each picking finger 52 has two pairs of aligned bolts holes 66 therethrough to opposite sides of the picking finger 52 and so located as to vertically align with the horizontal flanges of the bars 24 and 46 for reception of securing bolts 68 therethrough whereby each of the support plates 56 is directly bolted to the overlying bar flanges with the corresponding picking finger 52 in effect firmly sandwiched therebetween. These bolts 68 of course have appropriate heads and nuts thereon. With reference to the bottom plan view of FIG. 6 in particular, it will be noted that each of the support plates 56 is relieved or provided with opposed edge recesses 70 between the two bottom mounting bars 24 and 46 so as to provide for relatively large openings through which any dirt or the like raised with the rocks can easily fall or be discharged notwithstanding the relatively wide nature of the support plates 56 in this area as is desirable in providing for a firm and rigid bolting of the finger units 18 to the framework. FIG. 6 is also of interest in illustrating the forwardly tapering nature of the support plates from the forward transverse bar 46 whereby a positive support for the picking fingers 52 is achieved while still retaining a maximum amount of open space through which dirt or the like can pass and be redeposited on the ground. It will of course be appreciated that this tapered configuration also facilitates an actual driving of the finger units 18 into the ground should such be necessary to loosen or elevate stones or rocks.

Each of the picking finger units 18 further includes an elongated rigid diagonal support rod 72 having the forward end thereof rigidly welded to the corresponding picking finger 52 immediately rearward of the plate sleeve 58, this rod 72 projecting rearwardly and upwardly at an angle to the picking finger or tooth 52 and terminating in a horizontal threaded end portion 74. The threaded rear end 74 of each of these support rods 72 is received through a hole in a vertical plate 76 welded to the forward vertical flange of the angle bar 46 with an appropriate securing nut 78 being threaded on the rod end 74 for rigidly affixing the support rod 72 to the plate 76 and thereby effectively supporting the outer end portion of the corresponding picking finger or tooth unit 18 with substantially no increase to the bulk thereof. Each of the mounting plates 76 has the upper edge thereof stabilized by a diagonal bracing plate 80 having the lower edge thereof welded to the upper edge of the plate 76 and projecting upwardly and rearwardly therefrom and terminating in a horizontal rearwardly projecting end portion 82 which underlies the forwardly projecting horizontal flange of the transverse intermediate bar 22, this horizontal end portion 82 being rigidly bolted to the bar flange by appropriate bolt and nut means. These bracing bars 80, as will be appreciated from FIGS. 2 and 3, are also relatively narrow so as to allow for the free passage of dirt therethrough and not add significantly to the bulb of the picker head, while at the same time effectively acting so as to transfer the stress of a received load to the backstop or basic framework of the piker head.

Finally, the picker head 10 is provided with a pair of side units 86, each of which includes an elongated pointed rodlike member or tooth 88 and a rodlike support member or rod 90 welded to the forward end of the tooth 88 immediately rearwardly of the pointed end thereof and extending rearwardly and upwardly therefrom, terminating in a horizontal threaded portion 92. One unit 86 is mounted on each of the lateral sides of the framework in an elevated position relative to the picking teeth units 18 as will be best appreciated in FIGS. 3, 4 and 5. The tooth 88 of each unit 86 is secured by a pair of U-bolts 94 encircling the rodlike member 88 and extending through a pair of aligned apertures within a pair of plates 96 and 98, the plate 96 being welded to the adjoining side vertical bar 26 and the plate 98 being welded to the diagonal bracing bar 50. The plates 96 and 98 are to include a plurality of bolt receiving holes vertically aligned therein so as to enable a slight variation in the vertical position of the rodlike tooth 88. The support rod 90 of each unit has the threaded rear end thereof received through a rigid plate 100 welded to the corresponding diagonal brace bar 50 at an elevated position relative to the lower plate 98, the plate received end 92 of the rod 90 having an appropriate securing nut 102 threaded thereon. In this manner each of the side units 86 is rigidly affixed to the framework for use as an auxiliary digging device as well as means for retaining the head supported rocks. From the foregoing, it will be appreciated that a unique rock picker head has been defined, this head incorporating a plurality of teeth specifically adapted for both digging around and subsequently removing rocks or the like from a field with the dirt itself, dislodged with the rock, being free to all through the picker head and be redeposited on the ground. The individual teeth of the picker head are braced and supported in a manner which adds a substantial degree of rigidity to these teeth, the collars 58 and support rods 72 also tending to absorb the thrust introduced to the teeth when engaging a load. Further, the entire head is capable of both vertical and pivotal adjustment, thereby facilitating both a loading and an unloading of the head.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

I claim:

1. In a rock picker, a picker head, said head including a vertical backstop having upper and lower edges, a plurality of elongated rodlike picking teeth affixed to said backstop at spaced points therealong adjacent the lower edge thereof, said teeth projecting laterally from said backstop to one side thereof in parallel relation to each other and terminating in forward end portions, an elongated support rod affixed to each tooth toward the forward end portion thereof and extending upwardly and rearwardly therefrom toward the backstop for rigidification relative thereto, and a continuous elongated rigid support plate centrally underlying a major portion of the length of each tooth rearward from the forward end portion thereof and being rigidly affixed thereto, each support plate being laterally spaced from the adjoining support plates so as to define soil passing passages therebetween.

2. The picker of claim 1 including a lower bar on said backstop extending longitudinally along substantially the full length of the lower edge thereof, and a second bar parallel and generally coplanar with said first bar in forwardly spaced relation thereto, the rear portions of said teeth and support plates underlying said bars and extending transversely thereacross, and means fixedly clamping each support plate to said bars with the corresponding tooth fixedly clamped therebetween.

3. The picker of claim 2 including a plurality of brace bar means extending between and engaged with said forward second bar and said backstop at a predetermined height thereon above the forward edge of said backstop.

4. The picker of claim 3 wherein one of said brace bar means is in alignment with each tooth, said brace bar means being laterally spaced from each other, and each of the support rods affixed to the teeth having the rear end thereof rigidly affixed to the corresponding brace bar means immediately above the forward second bar.

5. The picker of claim 4 including a pair of load retaining and auxiliary digging side members rigid with the opposed sides of said backstop and projecting forwardly therefrom generally parallel to said teeth for a major portion of the length of said teeth, each of said side members being located in an elevated position relative to said teeth and comprising an elongated rodlike digging member and a support rod affixed to the forward end portion of said rodlike member and projecting upwardly and rearwardly therefrom for fixed engagement with said backstop.

6. In a picking head, a picking tooth unit comprising an elongated rigid rodlike tooth, a flat elongated plate underlying, a major portion of said tooth commencing at a first end thereof, means fixing said tooth to said plate centrally therealong, and a rigid support rod fixed to the opposite side of said tooth from said plate inward of the second end of said tooth, said support rod diverging rearwardly from said tooth from the point of engagement therewith.

7. The construction of claim 6 wherein said support plate is of a progressively greater width rearward from approximately the point of engagement of the support rod with the tooth.

8. The construction of claim 7 wherein the opposed edges of said support plate, toward the first end of said tooth, are inwardly relieved so as to define a pair of opposed recesses.

9. In a rock picker, a picker head, said head including a vertical backstop, said backstop including an elongated mounting bar along the lower portion thereof, a second mounting bar parallel to and laterally spaced from said first mounting bar, means for rigidly interconnecting said bars in generally coplanar relation to each other, a plurality of picking teeth terminating in forward ground piercing end portions, said picking teeth being orientated in laterally spaced parallel relation to each other and having rear end portions thereof underlying and extending transversely across said two bars so as to project laterally therebeyond, an elongated support plate underlying a major portion of each picking tooth rearward of the forward end portion, means for rigidly affixing each support plate to and along the corresponding tooth so as to provide an elongated support therefor, and means for rigidly clamping each support plate to both bars so as to clamp the corresponding tooth portion therebetween, each of said support plates being laterally spaced from the adjacent support plates.

10. The picker of claim 9 wherein each of the support plates has opposed edges diverging from each other rearward from the forward end portion of the corresponding said tooth, said plate edges being inwardly relieved between the parallel bars so as to define enlarged opposed edge recesses whereby the free passage of dirt therethrough is possible.

11. The picker of claim 10 including a support rod affixed to each tooth at a point forward of said bars, said support rod extending rearwardly and upwardly for fixed engagement with said backstop.

12. The picker of claim 2 wherein each of said teeth is imperforate along the complete length thereof, said means fixedly clamping each support plate to the bars being so orientated as to engage the support plate and bars to the opposite sides of the corresponding tooth so as to retain the tooth therebetween.

13. The picker of claim 1 including an upwardly projecting collar fixed to the forward portion of each support plate and encircling the overlying tooth immediately forward of the support rod, and means rearward of said collar fixed to each support plate and encircling the overlying tooth for a fixing of the support plate to the tooth, each of said teeth being imperforate along the length thereof.